(12) United States Patent
Lang

(10) Patent No.: US 8,671,981 B2
(45) Date of Patent: Mar. 18, 2014

(54) FREEZE ROBUST ANODE VALVE AND PASSAGE DESIGN

(75) Inventor: Matthew A. Lang, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 161 days.

(21) Appl. No.: 13/314,484

(22) Filed: Dec. 8, 2011

(65) Prior Publication Data

US 2013/0146795 A1  Jun. 13, 2013

(51) Int. Cl.
*F16K 31/02* (2006.01)
*F16K 1/00* (2006.01)

(52) U.S. Cl.
USPC ............. 137/614.11; 137/244; 251/129.15; 251/318

(58) Field of Classification Search
USPC ............. 251/129.15, 318, 319; 137/614.11, 137/614.18, 244, 243, 243.6
See application file for complete search history.

(56) References Cited

U.S. PATENT DOCUMENTS

| | | | | |
|---|---|---|---|---|
| 3,527,244 | A * | 9/1970 | Stockman | 137/244 |
| 4,681,142 | A * | 7/1987 | Woeller et al. | 137/614.18 |
| 6,737,766 | B1 * | 5/2004 | Burrola et al. | 251/129.15 |
| 8,434,734 | B2 * | 5/2013 | Birkelund | 251/129.15 |

* cited by examiner

*Primary Examiner* — Kevin Lee
(74) *Attorney, Agent, or Firm* — Fraser Clemens Martin & Miller LLC; J. Douglas Miller

(57) ABSTRACT

A valve for a fuel cell system includes a valve housing having an inlet and an outlet formed therein. Each of the inlet and the outlet includes a passage formed therein to permit a fluid to flow through the valve housing. A movable member is disposed in the valve housing and is movable between an open position and a closed position. The movable member includes a sliding portion having a first flow regulator and a second flow regulator extending laterally outwardly therefrom. At least a portion of the first flow regulator is disposed in the passage of the inlet and at least a portion of the second flow regulator is disposed in the passage of the outlet when the movable member is in the closed position militating against a formation of ice across the entire opening of the inlet and the outlet.

15 Claims, 2 Drawing Sheets

FREEZE ROBUST ANODE VALVE AND PASSAGE DESIGN

FIELD OF THE INVENTION

The disclosure relates to a valve and, more particularly, to an anode valve for a fuel cell system.

BACKGROUND OF THE INVENTION

A fuel cell system is an electro-chemical device that includes an anode and a cathode with an electrolyte therebetween. The anode receives a fuel such as hydrogen and the cathode receives an oxidant such as oxygen or air. When the fuel is supplied to a reaction plane of the anode via an anode loop, the fuel is ionized and the fuel ions are transferred to the cathode via a solid polymer electrolyte membrane. During this process, electrons are generated and flow, either through a bipolar plate to an adjacent cell, or to an external circuit, providing direct current electric energy. As the oxidant is supplied to the cathode via a cathode loop, the fuel ions, electrons, and the oxidant react at the cathode and produce water. The water is exhausted from the fuel cell system by means of a cathode exhaust passage. Typically, not all of the water is exhausted from the fuel cell system.

Valves are typically disposed in the anode loop to control various flows and parameters of the fuel such as a pressure and purity of the fuel within the fuel cell system, for example. One such anode valve controls a flow of the fuel to the cathode for warm-up of the fuel cell system in a low-temperature environment. If water remains in the anode loop after shutoff of the fuel cell system and the fuel cell system is maintained in the low-temperature environment, the water remaining in the anode valve may freeze and form ice. The ice may form a blockage in the anode valve or a passage leading to the anode valve, and thereby, prevent normal operation of the anode valve. When the anode valve is not operating normally, it may be difficult to restart the fuel cell system, which is undesirable.

It would be desirable to produce an anode valve for a fuel cell system including a movable member to militate against ice blockage, wherein energy and time required to bring the anode valve to a normal operating condition are minimized.

SUMMARY OF THE INVENTION

In concordance and agreement with the present invention, an anode valve for a fuel cell system including a movable member to militate against ice blockage, wherein energy and time required to bring the anode valve to a normal operating condition are minimized, has been surprisingly discovered.

In one embodiment, the valve for a fuel cell system, comprises: a valve housing including an inlet and an outlet formed therein, each of the inlet and the outlet including a passage to permit a fluid to flow through the valve housing; and a movable member disposed in the valve housing and linearly movable between an open position and a closed position, wherein at least a portion of the movable member is disposed in at least one of the inlet and the outlet of the valve housing militating against a formation of ice across an opening of the at least one of the inlet and the outlet when the movable member is in the closed position.

In another embodiment, the valve for a fuel cell system, comprises: a valve housing including an inlet and an outlet formed therein, each of the inlet and the outlet including a passage to permit a fluid to flow through the valve housing; and a movable member disposed in the valve housing and movable between an open position and a closed position, the movable member including a first flow regulator and a second flow regulator formed thereon, wherein at least a portion of the first flow regulator is disposed in the inlet of the valve housing and at least a portion of second flow regulator is disposed in the outlet of the valve housing militating against a formation of ice across an opening of each of the inlet and the outlet when the movable member is in the closed position.

In another embodiment, the valve for a fuel cell system, comprises: a valve housing including an inlet and an outlet formed therein, each of the inlet and the outlet including a passage to permit a fluid to flow through the valve housing; and a movable member disposed in the valve housing and movable between an open position and a closed position, the movable member including a sliding portion having a first flow regulator and a second flow regulator formed thereon, wherein the sliding member is positioned away from the inlet and the outlet so as to form a flow path when the movable member is in the open position, and wherein at least a portion of the first flow regulator is disposed in the inlet of the valve housing and at least a portion of second flow regulator is disposed in the outlet of the valve housing militating against a formation of ice across an opening of each of the inlet and the outlet when the movable member is in the closed position.

BRIEF DESCRIPTION OF THE DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
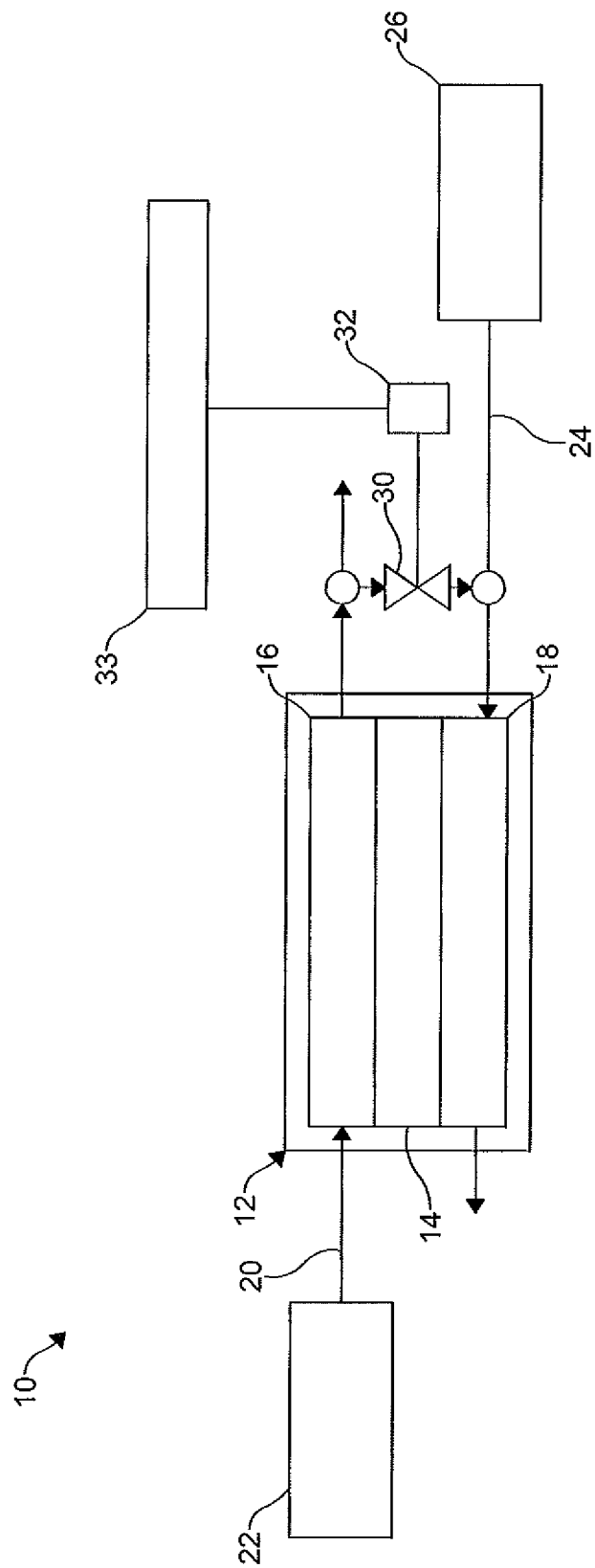
FIG. 1 is a schematic flow diagram of a fuel cell system including fuel cell stack and a valve of the present invention.

In FIG. 1, a fuel cell system 10 of the type in which the present invention may be practiced is shown generically, in a simplified form. Although a single fuel cell 12 is shown, the fuel cell system 10 can have many fuel cells 12 disposed adjacent to each other so as to form a stack. The fuel cell 12 includes an electrolyte 14 such as a polymeric electrolyte proton exchange membrane, having two major surfaces adjacent to which are an anode 16 and a cathode 18. Fuel (e.g. hydrogen) is fed via an anode conduit 20 to the anode 16 in gaseous form from a fuel source 22, and an oxidant (e.g. oxygen or air) is supplied via a cathode conduit 24 to the cathode 18 from an oxidant source 26. In accordance with the invention, in a low-temperature environment, the fuel is passed from the fuel source 22 through a valve 30, operated by an actuator 32. The fuel is mixed with the oxidant to provide a dilute fuel/oxidant mixture to the cathode 18 to warm-up the fuel cell 12. Typically, a controller 33 controls the actuator 32 to open the valve 30 when the vehicle is to be started and controls the actuator 32 to close the valve 30 to avoid overheating of the cathode 18. The actuator 32 may be a linear actuator, for example. In a particular embodiment, the actuator 32 is a solenoid. A skilled artisan may select other types of actuators 32 for operating the valve 30, as desired. Although the valve 30 described hereinafter is for use in the anode conduit 20 of the fuel cell system 10, it is understood that the valve 30 can be employed at other locations within the fuel cell system 10, within the scope of the present disclosure.

Figure 2:
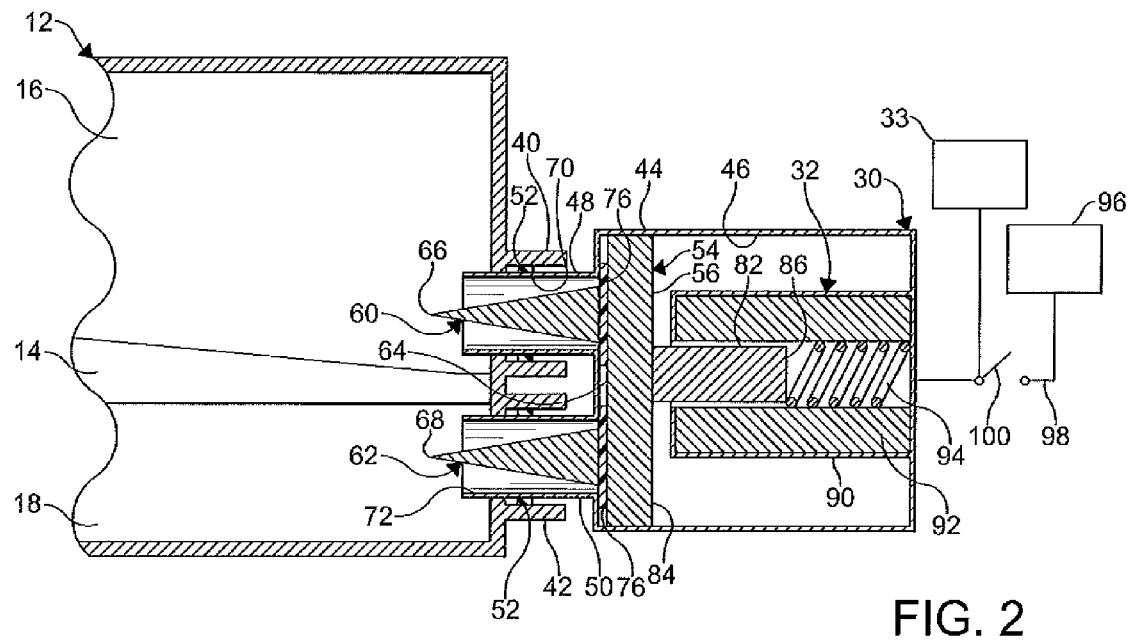
FIG. 2 is a schematic, fragmentary, cross-sectional elevational view of the valve coupled to the fuel cell system according to an embodiment of the present invention, showing a movable member of the valve in a closed position.
Figure 3:
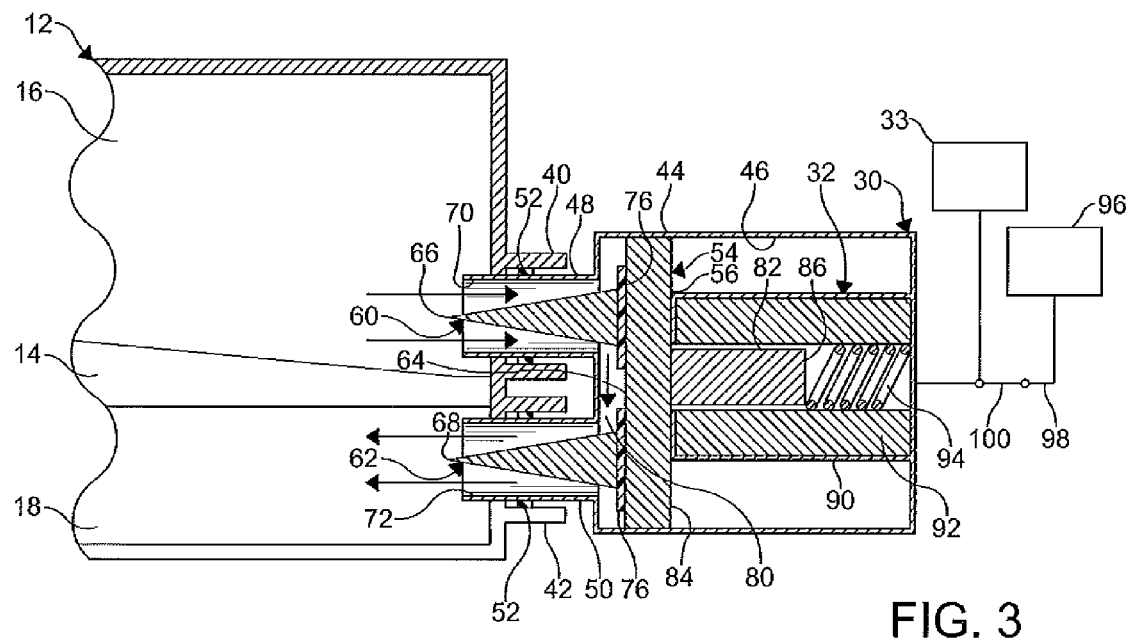
FIG. 3 is a schematic, fragmentary, cross-sectional elevational view of the valve coupled to the fuel cell system as illustrated in FIG. 2, showing the movable member of the valve in an open position.

FIGS. 2-3 show the valve 30 of the fuel cell system 10 according to an embodiment of the invention. As a non-limiting example, the valve 30 may be a valve in fluid communication with an outlet 40 of the anode 16 and an inlet 42 of the cathode 18 of the fuel cell system 10. The valve 30 may advantageously militate against a formation and buildup of ice in the valve 30 during a shutdown of the fuel cell system 10.

The valve 30 includes a valve housing 44 having a passage 46 formed therein. The valve housing 44 includes an inlet 48 and a spaced apart outlet 50. The inlet 48 is received in the outlet 40 of the anode 16 and the outlet 50 is received in the inlet 42 of the cathode 18. A sealing member 52 can be disposed between the inlet 48 of the valve housing 44 and the outlet 40 of the anode 16 and between the outlet 50 of the valve housing 44 and the inlet 42 of the cathode 18. The valve housing 44 is supplied with a fluid such as the fuel or the oxidant, for example, through the inlet 48 and the fluid is discharged from the valve housing 44 through the outlet 50. The valve housing 44 may be formed as a single unitary piece, or from more than one piece, as desired.

A movable member 54 is axially, displaceably disposed in the valve housing 44. The movable member 54 is movable between a closed position (shown in FIG. 2) and an open position (shown in FIG. 3) by sliding within the passage 46 of the valve housing 44 to selectively open and close the valve 30. The movable member 54 is rigid and substantially fluid impermeable. For example, the movable member 54 may be metallic, polymeric, or composite, as desired. As shown in FIGS. 2-3, the movable member 54 includes a sliding portion 56 having a generally circular cross-sectional shape. As a non-limiting example, the sliding portion 56 may be a thin plate that traverses the passage 46 of the valve housing 44. A skilled artisan may select a thickness and an ability of the sliding portion 56 to withstand excessive deformation. The sliding portion 56 may include a sealing member (not shown) disposed around an outer periphery thereof to militate against a leakage of the fluid from the valve 30 to the atmosphere. Additional or fewer sealing members than shown can be employed, if desired.

A pair of spaced apart, laterally extending flow regulators 60, 62 is formed on the sliding portion 56 of the movable member 54. A diameter of each of the flow regulators 60, 62 gradually decreases from a first surface 64 of the sliding portion 56 to ends 66, 68 of the flow regulators 60, 62. As shown in FIG. 2, the diameter of the flow regulator 60 is less than a diameter of a passage 70 formed in the inlet 48, permitting at least a portion of the flow regulator 60 to be disposed in the passage 70 when the valve 30 is closed. Similarly, the diameter of the flow regulator 62 is less than a diameter of a passage 72 formed in the outlet 50, permitting at least a portion of the flow regulator 62 to be disposed in the passage 72 when the valve 30 is closed. The diameter of each of the flow regulators 60, 62 is proportional to the diameter of the respective passages 70, 72 to obtain the desired effective flow factor $K_V$ of the valve 30 when the valve 30 is open. As shown, a length of the flow regulators 60, 62 is such that a portion thereof remains in the respective passages 70, 72 when the movable member 54 is in the open position to maintain alignment of the movable member 54.

A sealing member 76 may be disposed on each of the flow regulators 60, 62 adjacent the first surface 64 of the sliding portion 56 if desired. The sealing member 76 disposed on the flow regulator 60 forms a fluid-tight seal between the movable member 54 and the valve housing 44 to militate against the flow of the fluid through the inlet 48 when the valve 30 is closed. The sealing member 76 disposed on the flow regulator 62 forms a fluid-tight seal between the movable member 54 and the valve housing 44 to militate against the flow of the fluid through the outlet 50 when the valve 30 is closed. When the valve 30 is open, as shown in FIG. 3, the sliding portion 56 of the movable member 54 and the sealing members 76 are positioned away from the inlet 48 and the outlet 50 so as to form a flow path 80. The flow path 80 fluidly connects the passage 70 of the inlet 48 and the passage 72 of the outlet 50 to permit the flow of the fluid through the valve 30.

The movable member 54 further includes a stem portion 82 extending laterally outwardly from the sliding portion 56. The stem portion 82 has a generally uniform diameter and extends from a second surface 84 of the sliding portion 56 to an end 86 thereof. It is understood, however, that the stem portion 82 can have any shape and size as desired. At least a distal portion of the stem portion 82 is produced from a magnetic material such as stainless steel, for example. It is understood that the entire stem portion 82 or movable member 54 can be formed from the magnetic material if desired. The stem portion 82 is operatively coupled to the actuator 32 for selectively positioning the movable member 54 between a closed position, as shown in FIG. 2, and an open position, as shown in FIG. 3.

The actuator 32 includes a housing 90 having a coil 92 disposed therein. It is understood that the coil 92 is of such a size as to allow for shearing of any ice that has formed between the flow regulators 60, 62 and the inner surface of the passages 70, 72. The coil 92 is disposed around the stem portion 82. A return mechanism 94 is interposed between the stem portion 82 and the housing 90. The return mechanism 94 biases the movable member 54 to be displaced toward the inlet 48 and the outlet 50 to close the valve 30. As illustrated, the actuator 32 is in electrical communication with a power source 96. The power source 96 supplies electrical current through an electrical path 98 to the actuator 32 for energizing the coil 92. A switch 100 may be disposed in the electrical path 98 to permit or interrupt a flow of the electrical current from the power source 96. As shown, the switch 100 is opened and closed by the controller 33 of the fuel cell system 10.

Operation of the valve 30 is described hereinafter. When the switch 100 is opened by the controller 33 of the fuel cell system 10, as shown in FIG. 2, the flow of the electrical current from the power source 96 is interrupted. Accordingly, the coil 92 is not energized and the return mechanism 94 biases the movable member 54 towards the inlet 48 and the outlet 50 of the valve 30. In particular, a resilient force of the return mechanism 94 overcomes a pressure of the fluid in the inlet 48 and a back pressure of the fluid in the outlet 50 of the valve 30, maintaining a closed position of the movable member 54. Thus, the sealing members 76 of the movable member 54 abut the valve housing 44 of the valve 30 to form a fluid-tight seal therebetween. Further, at least a portion of the flow regulators 60, 62 is disposed in the passages 70, 72, occupying a central portion of the passages 70, 72. Accordingly, after shut off of the fuel cell system 10 in a low temperature environment, the water remaining in the anode conduit 20 is caused to freeze. As a result, a formation of ice is on the portion of the flow regulators 60, 62 disposed in the passages 70, 72 and between an inner surface of the passages 70, 72 and the flow regulators 60, 62. Thus, the flow regulators 60, 62 militate against the formation of ice across an entire opening of the passages 70, 72.

At startup of the fuel cell system 10, when warm-up of the fuel cell 12 is typically desired, the switch 100 is closed by the controller 33, as illustrated in FIG. 3. When the switch 100 is closed by the controller 33, the electrical current is permitted to flow from the power source 96 to the actuator 32. Consequently, the coil 92 is energized to generate magnetic fluxes which flow from the coil 92 to the moveable member 54 and then back to the coil 92 creating a magnetic force. The magnetic force causes the movable member 54 to move towards the coil 92 against the resilient force of the return mechanism 94. Thus, the sealing members 76 of the movable member 54 are displaced from the valve housing 44 and the sliding portion 56 is positioned away from the inlet 48 and the outlet 50, thereby permitting the flow of the fuel through the flow path 80 of the valve 30. Because the flow regulators 60, 62 militate against the formation of ice across the entire opening of the passages 70, 72 when the valve 30 is closed, any ice that forms on the flow regulators 60, 62 and between the inner surface of the passages 70, 72 and the flow regulators 60, 62 as a result of the water remaining in the anode conduit 20 is easily overcome by displacement of the flow regulators 60, 62. The displacement of the flow regulators 60, 62 provides a substantially annulus-shaped passage between the ice formed in the passages 70, 72 and the flow regulators 60, 62, thereby permitting the flow of the fuel through the passages 70, 72 and the flow path 80. Accordingly, the valve 30 minimizes the electrical current (i.e. energy) and a time required to bring the valve 30 to a normal operating condition versus employing a heater to melt the ice as is commonly known.

While certain representative embodiments and details have been shown for purposes of illustrating the invention, it will be apparent to those skilled in the art that various changes may be made without departing from the scope of the disclosure, which is further described in the following appended claims.

The invention claimed is:

1. A valve for a fuel cell system, comprising:
a valve housing including an inlet and an outlet formed therein, each of the inlet and the outlet including a passage to permit a fluid to flow through the valve housing; and
a movable member disposed in the valve housing and movable between an open position and a closed position, the movable member including a first flow regulator and a second flow regulator formed thereon, wherein at least a portion of the first flow regulator is disposed in the inlet of the valve housing and at least a portion of second flow regulator is disposed in the outlet of the valve housing militating against a formation of ice across an opening of each of the inlet and the outlet when the movable member is in the closed position.

2. The valve according to claim 1, further comprising a sealing member disposed on each of the first flow regulator and the second flow regulator.

3. The valve according to claim 2, wherein a fluid-tight seal is formed between the valve housing and the sealing member disposed on each of the first flow regulator and the second flow regulator when the movable member is in the closed position.

4. The valve according to claim 1, wherein the movable member includes a sliding portion and a stem portion.

5. The valve according to claim 1, wherein the inlet and the outlet are fluidly connected by a flow path formed in the valve housing when the movable member is in the open position.

6. The valve according to claim 1, further comprising an actuator operatively coupled to the movable member for facilitating an axial movement of the movable member within the valve housing.

7. The valve according to claim 6, wherein the actuator is a solenoid.

8. A valve for a fuel cell system, comprising:
a valve housing including an inlet and an outlet formed therein, each of the inlet and the outlet including a passage to permit a fluid to flow through the valve housing; and
a movable member disposed in the valve housing and movable between an open position and a closed position, the movable member including a sliding portion having a first flow regulator and a second flow regulator formed thereon, wherein the sliding member is positioned away from the inlet and the outlet so as to form a flow path when the movable member is in the open position, and wherein at least a portion of the first flow regulator is disposed in the inlet of the valve housing and at least a portion of second flow regulator is disposed in the outlet of the valve housing militating against a formation of ice across an opening of each of the inlet and the outlet when the movable member is in the closed position.

9. The valve according to claim 8, further comprising a sealing member disposed on each of the first flow regulator and the second flow regulator.

10. The valve according to claim 9, wherein a fluid-tight seal is formed between the valve housing and the sealing member disposed on each of the first flow regulator and the second flow regulator when the movable member is in the closed position.

11. The valve according to claim 8, wherein the inlet and the outlet are fluidly connected by the flow path when the movable member is in the open position.

12. The valve according to claim 8, wherein at least one of the flow regulators has a length such that a portion thereof remains in at least one of the inlet and the outlet of the valve housing when the movable member is in the open position.

13. The valve according to claim 8, wherein the movable member further includes a stem portion extending laterally outwardly from the sliding portion.

14. The valve according to claim 13, wherein at least a portion of the stem portion of the movable member is formed from a magnetic material.

15. The valve according to claim 13, further comprising an actuator operatively coupled to the stem portion of the movable member for facilitating an axial movement of the movable member within the valve housing.

* * * * *